United States Patent
Tong et al.

(10) Patent No.: US 10,998,965 B2
(45) Date of Patent: *May 4, 2021

(54) HIGH THROUGHPUT SATELLITES AND METHODS OF OPERATING HIGH THROUGHPUT SATELLITES FOR RELAYING DATA BETWEEN LOW EARTH ORBIT SATELLITES TO ENDPOINTS

(71) Applicant: Asia Satellite Telecommunications Company Limited, Wanchai (HK)

(72) Inventors: Roger Shun Hong Tong, New Territories (HK); Fred Chun Yin Vong, New Territories (HK); Harry Yin Chung Leung, New Territories (HK); Hai Hu, New Territories (HK); Man Hei Chan, New Territories (HK); Kat Fan Yip, New Territories (HK)

(73) Assignee: ASIA SATELLITE TELECOMMUNICATIONS COMPANY LIMITED, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,200

(22) Filed: Dec. 31, 2019

(65) Prior Publication Data
US 2020/0259560 A1 Aug. 13, 2020

Related U.S. Application Data

(63) Continuation of application No. 16/026,816, filed on Jul. 3, 2018, now Pat. No. 10,523,312.

(51) Int. Cl.
*H04B 7/185* (2006.01)
*H04B 7/195* (2006.01)
*H04B 7/204* (2006.01)

(52) U.S. Cl.
CPC ..... *H04B 7/18521* (2013.01); *H04B 7/18513* (2013.01); *H04B 7/195* (2013.01); *H04B 7/2041* (2013.01)

(58) Field of Classification Search
CPC ............ H04B 7/18521; H04B 7/18513; H04B 7/2041
See application file for complete search history.

(56) References Cited

U.S. PATENT DOCUMENTS 6,726,152 B2   4/2004 Higgins
9,973,984 B1   5/2018 Hall et al.
(Continued)

OTHER PUBLICATIONS

"EDRS (European Data Relay Satellite) Constellation / SpaceDataHighway", [https://eoportal.org/web/eoportal/satellite-missions/content/-/article/edrs], last retrieved Jun. 12, 2018, 26 pages.
(Continued)

*Primary Examiner* — Bo Hui A Zhu
(74) *Attorney, Agent, or Firm* — Hanley, Flight & Zimmerman, LLC

(57) ABSTRACT

A high throughput satellite (HTS) and a method of operating the HTS for relaying data between a low earth orbit (LEO) satellite and a target ground station, where the HTS provides spot beams for a spot beam coverage area. The method of operating the HTS includes: determining an estimated trajectory of an orbiting LEO satellite; assigning a plurality of assigned spot beams having a matching color re-use polarization; and transmitting assignments of the plurality of assigned spot beams to the high throughput satellite to cause the high throughput satellite to maintain the inter-satellite link via a first spot beam and one or more assigned subsequent spot beams having the matching color re-use polarization.

21 Claims, 10 Drawing Sheets

(56) References Cited

U.S. PATENT DOCUMENTS

| | | | |
|---|---|---|---|
| 10,243,654 B1* | 3/2019 | Uyeno | H04B 10/40 |
| 10,523,312 B1 | 12/2019 | Tong et al. | |
| 2017/0215190 A1 | 7/2017 | Chung | |
| 2018/0019809 A1 | 1/2018 | Hreha et al. | |
| 2019/0075485 A1* | 3/2019 | Xenakis | H04W 28/20 |

OTHER PUBLICATIONS

"Tracking and Data Relay Satellite (TDRS)", [https://www.nasa.gov/directorates/heo/scan/services/networks/tdrs_main], published Sep. 7, 2017, last updated on Feb. 22, 2018, 3 pages.

"UCS Satellite Database", [https://www.ucsusa.org/nuclear-weapons/space-weapons/satellite-data-base#.WtP6fi5ubb0], last retrieved Jun. 12, 2018, 4 pages.

ETSI, "Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X)", Oct. 2014, 139 pages.

Institute of Communcations and Navigation, "H2Sat (Heinrich-Hertz Satellite)", [http://www.dlr.de/kn/en/desktopdefault.aspx/tabid-4306/6938_read-19784/], last retrieved Jun. 12, 2018, 2 pages.

United States Patent and Trademark Office, "Notice of Allowance," issued in connection with U.S. Appl. No. 16/026,816, dated Aug. 26, 2019, 7 pages.

* cited by examiner

HIGH THROUGHPUT SATELLITES AND METHODS OF OPERATING HIGH THROUGHPUT SATELLITES FOR RELAYING DATA BETWEEN LOW EARTH ORBIT SATELLITES TO ENDPOINTS

RELATED APPLICATION(S)

This patent arises from a continuation of U.S. patent application Ser. No. 16/026,816, (Now U.S. Pat. No. 10,523,312) which was filed on Jul. 3, 2018. U.S. patent application Ser. No. 16/026,816 is hereby incorporated herein by reference in its entirety. Priority to U.S. patent application Ser. No. 16/026,816 is hereby claimed.

TECHNICAL FIELD

The present application relates to satellite communications, and more particularly to high throughput satellites and methods of operating high throughput satellites for relaying data from low earth orbit satellites to endpoints.

BACKGROUND

Earth or space observation satellites collect data including Earth images, land exploration data, weather observation data, maritime surveillance data, or forest monitoring data. Earth or space observation satellites are commonly low Earth orbit (LEO) satellites and orbit the Earth at an altitude in the range of 300 to 1,000 km above the Earth's surface. In 2017, approximately 1071 LEO satellites are in orbit and the number of LEO satellites to be launched is expected to increase.

LEO satellites require a communication link with a ground station for telemetry, tracking, and command (TT&C) and for transmitting Earth or space observation data to one or more ground stations. When used for Earth or space observation, LEO satellites can (1) capture and store Earth Observation (EO) data in on-board memory as the LEO satellite orbits the Earth; and (2) transmit the stored EO data when the LEO satellite has line-of-sight visibility with a ground station during a process known as "store and forward". The duration of time that the LEO satellite has line-of-sight visibility with the target ground station depends on the orbiting altitude and inclination of the LEO satellite and the latitude of the target ground station. As LEO satellites orbit at relatively low altitudes from the Earth's surface, the duration of time when the LEO satellite has line-of-sight visibility with a target ground station is typically in the range of 5 to 15 minutes per orbit of the Earth. When the LEO satellite has line-of-sight visibility with the target ground station, the LEO satellite can transmit data and telemetry to the target ground station and receive commands from the target ground station. In some scenarios, because the amount of EO data or TT&C data can be large, the duration of time required to transmit EO data to the target ground station can exceed the duration of time that the LEO satellite may have line-of-sight visibility with the target ground station. Any EO data or TT&C data not transmitted by the LEO satellite to the target ground station may continue to be stored in on-board memory and transmitted to the target ground station when the LEO satellite re-establishes line-of-sight visibility on a subsequent orbit of the Earth, thus delaying EO data transmission to the target ground station. When the EO data has a defined shelf life (e.g., weather observation data), delaying transmission of the EO data from the LEO satellite to the target ground station may render the weather observation data to become stale or out-of-date. Further, if TT&C data transmission and reception at the LEO satellite is delayed, a network operations center at the target ground station may be unable to resolve issues or otherwise control the LEO satellite in near real-time or in a timely way.

In some scenarios, to facilitate large amounts of EO and TT&C data transfer to network operations centers or target ground stations, several successively spaced ground terminals along the Earth's surface that corresponds to the trajectory of a given LEO satellite may be provided. However, building and operating a large number of ground terminals can be costly.

BRIEF DESCRIPTION OF THE DRAWINGS

Reference will now be made, by way of example, to the accompanying drawings which show example embodiments of the present disclosure, and in which.

Like reference numerals are used in the drawings to denote like elements and features.

DETAILED DESCRIPTION

Figure 1:
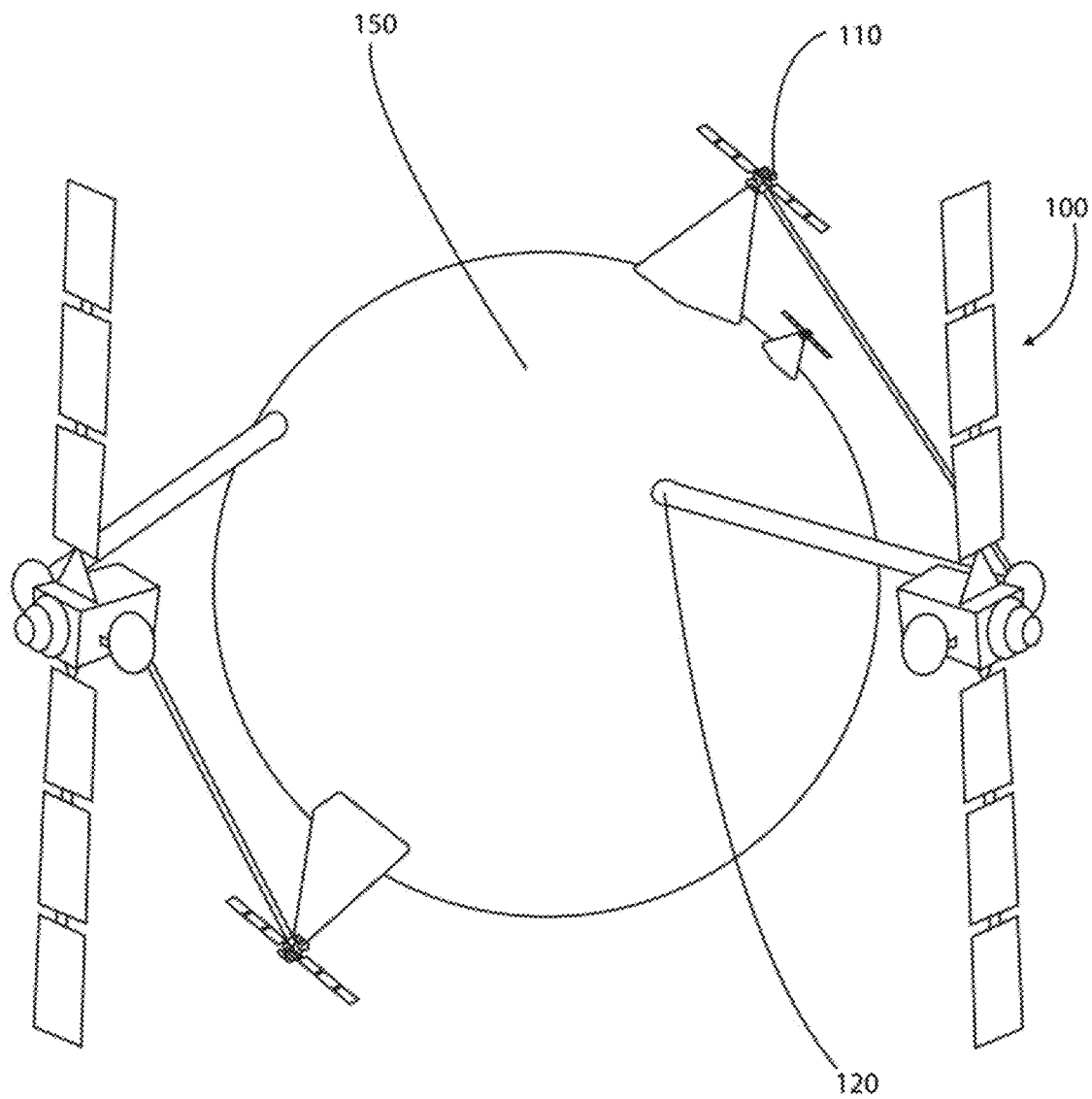
FIG. 1 illustrates an example European Data Relay Satellite (EDRS) in a geostationary orbit.

In one aspect, the present application describes a method of operating a high throughput satellite for relaying data between one or more low earth orbit (LEO) satellites and a target ground station. The high throughput satellite provides a plurality of spot beams for a spot beam coverage area. The method includes: determining an estimated trajectory of an orbiting LEO satellite travelling through the spot beam coverage area; assigning, based on the estimated trajectory, a plurality of assigned spot beams having a matching color re-use polarization for maintaining an inter-satellite link between the orbiting LEO satellite and the high throughput satellite as the orbiting LEO satellite travels through the spot beam coverage area; and transmitting assignments of the plurality of assigned spot beams to the high throughput satellite to cause the high throughput satellite to maintain the inter-satellite link via a first spot beam and one or more assigned subsequent spot beams having the matching color re-use polarization.

In another aspect, the present application describes a network operations center for controlling operation of a high throughput satellite relaying data between one or more low earth orbit (LEO) satellites and a target ground station. The high throughput satellite provides a plurality of spot beams for a spot beam coverage area. The network operations center includes: a high speed telemetry and command link to the high throughput satellite; a processor; and memory storing processor-executable instructions that, when executed by the processor, cause the processor to: determine an estimated trajectory of an orbiting LEO satellite travelling through the spot beam coverage area; assign, based on the estimated trajectory, a plurality of assigned spot beams having a matching color re-use polarization for maintaining the inter-satellite link between the orbiting LEO satellite and the high throughput satellite as the orbiting LEO satellite travels through the spot beam coverage area; and transmit assignments of the plurality of assigned spot beams to the high throughput satellite to cause the high throughput satellite to maintain the inter-satellite link via a first spot beam and one or more subsequent assigned spot beams having the matching color re-use polarization.

In another aspect, the present application provides a high throughput satellite comprising: a plurality of feeds providing a plurality of spot beams for a spot beam coverage area; and a digital processor to: receive assignments of a plurality of assigned spot beams for maintaining an inter-satellite link between an orbiting LEO satellite and the high throughput satellite as the orbiting LEO satellite travels through the spot beam coverage area; configure, based on an estimated trajectory of the orbiting LEO satellite, the plurality of assigned spot beams having a matching color re-use polarization for maintaining the inter-satellite link as the orbiting LEO satellite travels through the spot beam coverage area; establish the inter-satellite link with the orbiting LEO satellite via a first spot beam of the plurality of assigned spot beams; and transition the inter-satellite link from the first spot beam to subsequent assigned spot beams having the matching color re-use polarization as the LEO satellite travels through the spot beam coverage area.

Other example embodiments of the present disclosure will be apparent to those of ordinary skill in the art from a review of the following detailed description in conjunction with the drawings.

Any feature described in relation to one aspect or embodiment of the invention may also be used in respect of one or more other aspects/embodiments. These and other aspects of the present invention will be apparent from, and elucidated with reference to, the embodiments described herein.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Satellites are devices positioned in orbital space and are used for various purposes. In one example, satellites are communication satellites. That is, they are positioned in orbital space for the purpose of providing communications. For example, communication satellites are designed to relay communication signals between two end-points (which may be stationary or mobile) to provide communication services such as telephone, television, radio and/or internet services.

The satellites may employ a variety of orbital paths around the Earth. For example, satellites may have geostationary orbits, molniya orbits, elliptical orbits, polar and non-polar Earth orbits, etc. Communication satellites typically have geostationary orbits. That is, the communication satellites have a circular orbit above the Earth's equator and follow the direction of the Earth's rotation. A satellite in such an orbit has an orbital period equal to the Earth's rotational period, and accordingly may appear at a fixed position in the sky for ground stations.

Communication satellites are typically spaced apart along the geostationary orbit. That is, the satellites are positioned in orbital slots. The satellite operators coordinate use of orbital slots with each other under international treaty by the International Telecommunication Union (ITU), and the separation between slots depends on the coverage and frequency of operation of the satellites. In some examples, the separation between satellites may be between 2 to 3 degrees of orbital longitude. In some examples, the separation between satellites may be less than 2 degrees of separation. The separation of satellites in such a manner allows for frequency reuse for both uplink and downlink transmission. For example, by separating adjacent satellites by a distance greater than the transmitting beamwidth (i.e., the angle, measured in a horizontal plane, between the directions at which the power of the beam is at least one-half its maximum value) of an antenna associated with the ground station for uplink transmission, the same frequency for the communication signals may be employed to uplink to adjacent satellites with interference at or below the coordinated level. Similarly, if the separated distance between the adjacent satellites is greater than the receiving beamwidth of the antenna associated with the ground station for downlink transmission, the same frequency for the communication signals may be employed to downlink from adjacent satellites with interference at or below the coordinated level.

To perform communication functions, the satellite is equipped with various components. For example, the satellite may include a communication payload (which may further include transponders, one or more antennas, and switching systems), engines (to bring the satellite to the desired orbit), tracking and stabilization systems (used to orient the satellite and to keep the satellite in the correct orbit), power subsystems (to power the satellite) and command and control subsystems (to maintain communication with ground control stations).

The transponder of the satellite forms a communication channel between two end-points to allow for communications between the two end-points. The transponder also defines the capacity of the satellite for communications.

The antenna of the satellite transmits and receives communication signals. More specifically, the antenna is an electronic component that converts electric currents (which may be generated by a transmitter) for propagating radio frequency (RF) signal during transmission, and converts induced RF signals to electric currents during reception. In some examples, the antenna may be associated with an amplifier which may amplify the power of the transmitted or received RF signals.

The communication signals may be microwave signals. Microwave signals are RF signals that have wavelengths ranging from as long as one meter to as short as one millimeter. Equivalently, the frequency of the RF signals may range from 300 MHz to 300 GHz. More particularly, the communication signals are within certain frequency bands of microwave signals as they are more suited for satellite communications. In some examples, a satellite may operate within the frequency of the C-band defined by the ITU. The C-band is a portion of the electromagnetic spectrum that ranges from approximately 4 GHz to 8 GHz. That is, the communication signals are transmitted by and received at the satellite within such a frequency range. In some examples, the satellite may operate within frequencies higher than 8 GHz. For example, the satellite may operate within the frequency of the Ku-band. The Ku-band is the portion of the electromagnetic spectrum that ranges from approximately 10 GHz to 18 GHz. In some examples, the satellite may operate within other high frequencies above the Ku-band. For instance, the satellite may operate within the Ka-band frequency. The Ka-band is the portion of the electromagnetic spectrum that ranges from approximately 26.5 GHz to 40 GHz (at present, the assigned slots for fixed satellite service (FSS) are 27-31 GHz for uplink and 17.7-21.2 GHz for downlink). In some examples, the satellite may be configured to operate in more than one band. In one example, the satellite may be equipped to receive and transmit signals within the C-band, Ku-band, and Ka-band. It will be appreciated that the satellites may operate within other microwave frequency bands. For example, the satellites may operate in any one of the defined microwave frequency bands ranging in frequencies from approximately 1 GHz to 170 GHz. Examples of other microwave frequency bands include the X-band, Q-band, V-band, etc.

Earth or space observation satellites are commonly deployed for detecting and capturing data, such as Earth images, land exploration data, weather observation data, maritime surveillance data, or forest monitoring data. Earth or space observation satellites are commonly low Earth orbit (LEO) satellites and orbit the Earth at an altitude in the range of 300 to 1,000 km above the Earth's surface. LEO satellites require a communication link with a target ground station for telemetry, tracking, and command (TT&C) and for transmitting Earth or space observation data to one or more ground stations. When used for Earth or space observation, LEO satellites can (1) capture and store Earth Observation (EO) data in on-board memory as the LEO satellite orbits the Earth; and (2) transmit the stored EO data when the LEO satellite has line-of-sight visibility with a ground station during a process known as "store and forward". The duration of time when the LEO satellite may have line-of-sight visibility with a target ground station is typically in the range of 5 to 15 minutes per orbit of the Earth, and during this duration of time the LEO satellite can transmit data and telemetry to the target ground station and receive commands from the target ground station. When the amount of EO data or TT&C data is large, the duration of time required to transmit EO data to the target ground station can exceed the duration of time that the LEO satellite has line-of-sight visibility with the target ground station. Any EO data or TT&C data not yet transmitted to the target ground station may remain stored in on-board memory and transmitted at a later time to the target ground station when the LEO satellite re-establishes line-of-sight visibility on a subsequent orbit of the earth or another ground terminal. When EO data has a defined shelf life (e.g., weather observation data), delaying transmission of EO data can lead to the data becoming stale or out-of-date. In some configurations, several successively spaced ground terminals may be provided along the Earth's surface that corresponds to the trajectory of a given LEO satellite such that data can be continuously transmitted to a subsequent ground station if a transmission of a data set has not completed. However, building, operating, and managing a large number of ground terminals can be costly.

Accordingly, in some scenarios, geostationary (GEO) satellites may be provided for relaying data between a given LEO satellite (e.g., Earth or space observation satellite) and a target ground station for providing a greater duration of time which the given LEO satellite may transmit data to the target ground station.

Reference is now made to FIG. 1, which illustrates an example European Data Relay Satellite (EDRS) 100 in a geostationary orbit relative to the Earth 150. The EDRS provides global data relay services to user communities associated with the European Space Agency (ESA) and is currently a commercially operated data relay satellite. For example, the EDRS 100 is configured to relay data between an example LEO satellite 110 and a target ground station 120. The example EDRS 100 utilizes an optical inter-satellite link (OISL) providing return service (e.g., LEO satellite→GEO satellite→ground terminal) data rate of up to 1.8 Gbps and forward service (e.g., ground terminal→GEO satellite→LEO satellite) data rate of up to 500 bps for telemetry, tracking, and command (TT&C). The example EDRS 100 may also include a Ka-band radio transmitter to transmit data to a ground station. A Ka-band radio transmitter may be implemented with a steerable reflector antenna providing return service data rate of approximately 300 Mbps and forward service data rate of up to 1 Mbps.

Although the EDRS 100 utilizes an optical inter-satellite link that provides greater bandwidth, faster data transfer speeds, and less interference than radio frequency signalling technologies, the cost of installing optical transceivers on each of the LEO satellite, GEO satellite, and target ground station is high. Because optical inter-satellite links are point-to-point communication systems, the number data relay paths for LEO satellites to ground terminals is limited by cost. The number of optical laser communication terminals that can be installed on-board the respective satellites (e.g., earth deck of satellites with required field of view) can also be limited. In some examples, the EDRS 100 may only support data relay for a single LEO satellite. Further, the optical laser positioning accuracy requirement is higher than the radio frequency signal positioning accuracy requirements. For example, the radio frequency signal positioning accuracy is measured in the unit mRad, while the optical laser signal positioning accuracy is measured in the unit µRad or nRad (e.g., µRad or nRad is $10^3$ or $10^6$ times higher, respectively, than mRad). Further, the optical inter-satellite links may be susceptible to interference by clouds or other weather factors.

Figure 2:
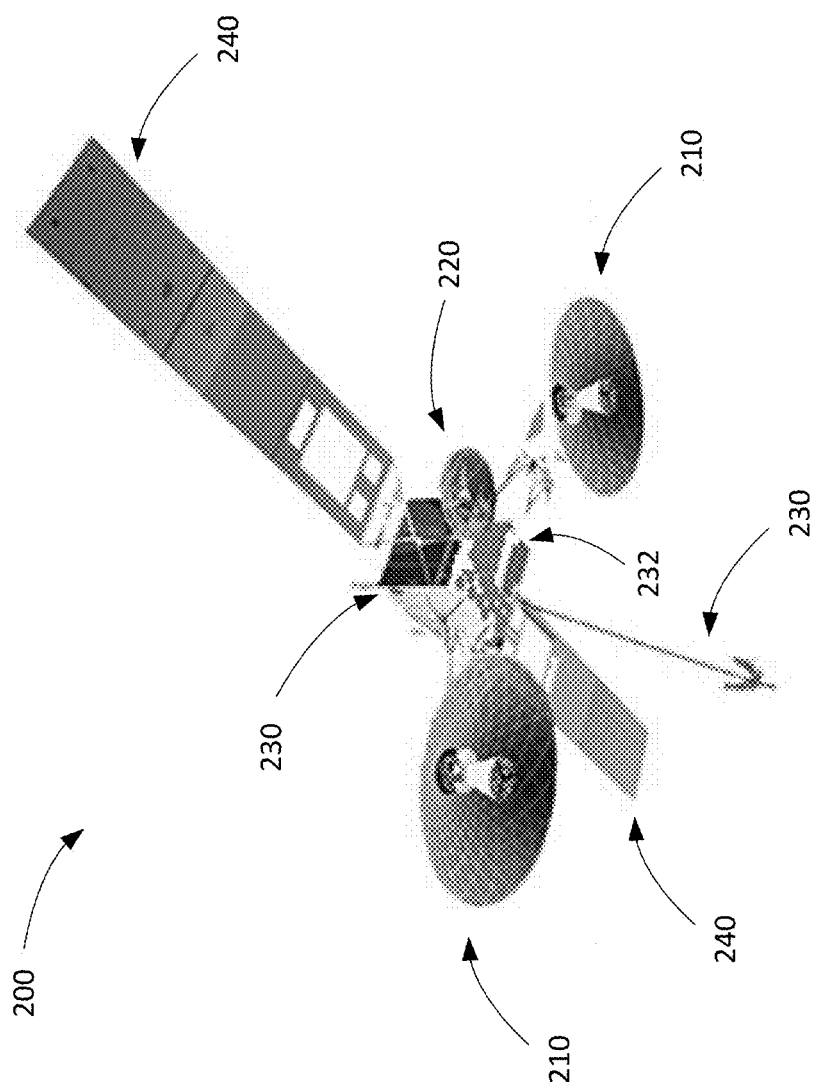
FIG. 2 illustrates an example Tracking and Data Relay Satellite (TDRS) for data relay operations.

Reference is now made to FIG. 2, which illustrates an example Tracking and Data Relay Satellite (TDRS) 200 for data relay operations. The TDRS 200 utilizes radio frequency signalling technology and includes two single access antennas 210, each having a diameter of approximately 15-feet for tracking LEO satellites. The single access antennas 210 provide data relay communication to a single LEO satellite at a time per antenna. The single access antennas 210 can operate using different bands including the S-band (2.0 to 3.0 GHz), the Ku-band (13.7 to 15 GHz), or the Ka-band (22.5 to 27.5 GHz). For the TDRS 200 to ground communication link, a dedicated 2.0 m/2.4 m Ku-band antenna 220 is used for providing the communication link between the TDRS 200 and a ground station at the White Sands Complex in New Mexico.

In addition, the TDRS 200 can include an Omni antenna 230 for transmission and reception of telemetry, tracking and command (TT&C). The TDRS 200 also includes multiple access antennas 232 implemented using the S-band frequencies and may use phased-array antennas to communicate with multiple satellites simultaneously (e.g., for low data-rate communications that generate time-sensitive data). The forward antenna used for uplink commands may include 15 elements, and the return antenna used for downlink telemetry may include 32 elements. The TDRS 200 may also include solar panels 240.

While the example TDRS 200 can provide high volume data delivery, the data relay operations are limited to single access. While phased-array antennas can support operations for multiple access, example phased-array antennas can only support transmission and reception of low data-rate command and telemetry data. Further, the TDRS 200 communicates with the specific ground terminal at White Sands Complex in New Mexico, thereby limiting options for transmitting and receiving to and from several other target ground stations. That is, the TDRS 200 may communicate with the specific ground terminal at White Sands Complex, limiting any flexibility in transmitting or receiving data to any other ground terminal at the surface of the Earth.

Figure 3:
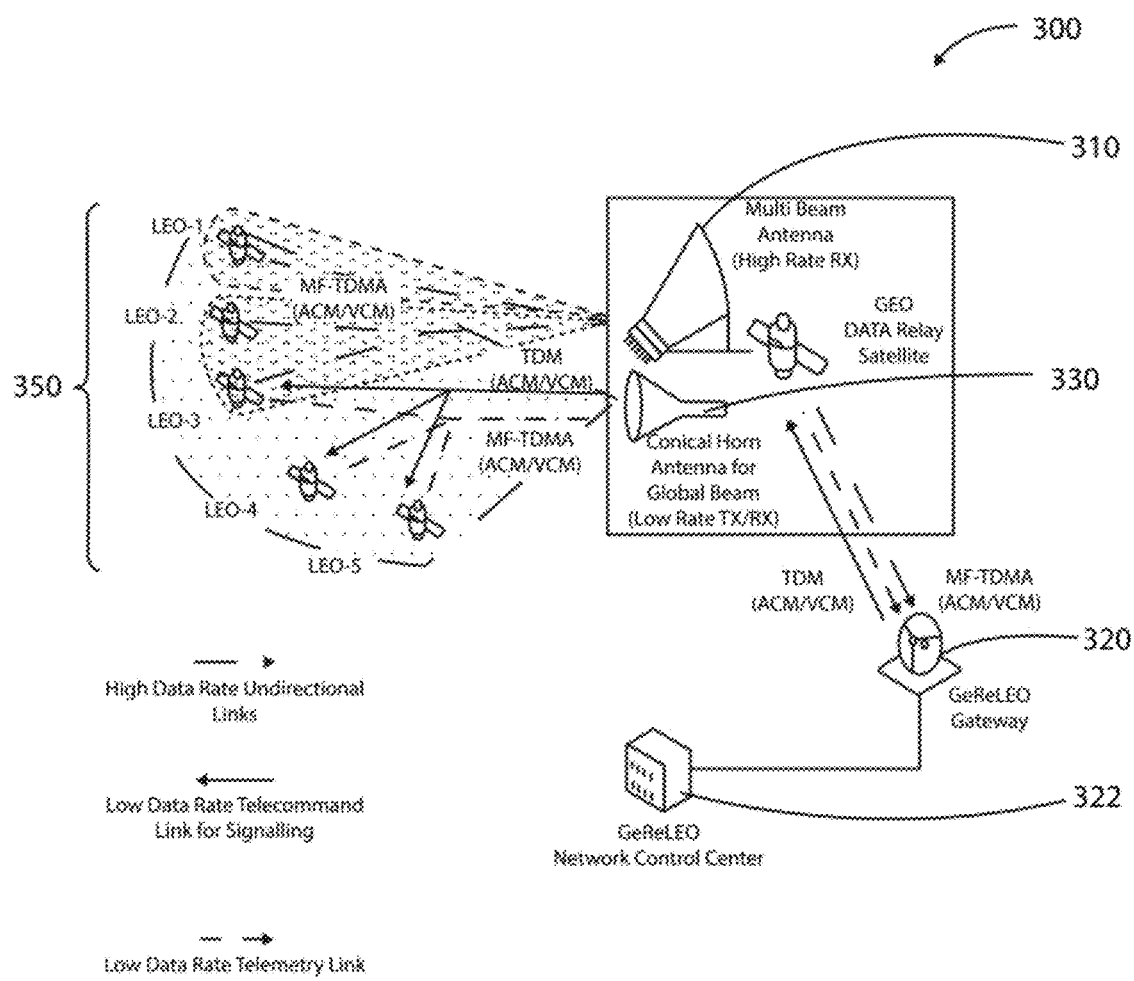
FIG. 3 illustrates components of an example Heinrich-Hertz Satellite (H2Sat)

Reference is now made to FIG. 3, which illustrates components of an example Heinrich-Hertz Satellite (H2Sat) 300. The H2Sat 300 is a geostationary satellite that can provide both high data-rate and low data-rate data relay communication links. High data-rate communication links are unidirectional communication links via a multi-beam receiving antenna 310. For example, the multi-beam receiving antenna 310 can provide a unidirectional link from a LEO satellite to the H2Sat 300 using Ka-band frequencies. The multi-beam receiving antenna 310 may include several electronically controlled beams and can serve up to 15 communication links simultaneously. The multi-beam receiving antenna 310 can include electronically controlled beams for tracking movement of LEO satellites 350 in orbit. When a tracked LEO satellite moves away from the coverage area of a given beam, another beam is switched on or activated, via a switch matrix for beam switching, to track the orbiting LEO satellite. Thus, while the H2Sat 300 can track LEO satellites moving along a trajectory path, precisely timed tracking and beam-switching operations are needed to track orbiting LEO satellites.

The multi-beam receiving antenna 310 may operate to relay data from LEO satellites to a gateway station 320, and the gateway station 320 may be in communication with a network control center 322.

The example H2Sat 300 also includes a conical horn antenna 330 for providing low data-rate communication links for relaying telemetry, tracking, and command data. The conical horn antenna 330 provides a low data-rate communication link for up to 10 to 15 LEO satellites within a given coverage area using time-division multiplexing (TDM).

While the example H2Sat 300 can support data relay for multiple LEO satellites, the multi-beam receiving antenna 310 has low antenna gain-to-noise temperature (G/T) as compared to the TDRS system illustrated in FIG. 2. Because LEO satellite uplink capabilities may be limited, the antenna gain-to-noise-temperature (G/T) for the LEO satellite to H2Sat 300 return link can impact the overall available data rate of data relay from the LEO satellite to the gateway station 320.

Further, because the example H2Sat 300 establishes a communication link with a single gateway station 320, the H2Sat 300 is unable to support transmission of confidential data directly to any other desired ground terminal. Data transmission needs to first be routed through the gateway station 320. Further, if the gateway station 320 is subject to natural disasters, is unavailable, or cannot support data communication at rated communication speeds due to temporary technical difficulties, the H2Sat 300 may be unable to provide data relay services from LEO satellites to ground terminals.

As numerous LEO satellites are currently in orbit around the Earth, it is desirable to provide data relay satellites that may respectively support multiple LEO satellites simultaneously. As described above, the example EDRS 100 of FIG. 1 and the example TDRS 200 of FIG. 2 may be unable to support high volume data relay operations for multiple LEO satellites. The example H2Sat 300 of FIG. 3 can support data relay for up to 15 LEO satellites via the multi-beam receiving antenna 310. However, the multi-beam receiving antenna 310 (e.g., array-fed reflector) has relatively low G/T attributed to high scan loss and accordingly impacts the maximum achievable data-rate for respective communication links. Further, with the example H2Sat 300, the return inter-satellite links via the multi-beam receiving antenna 310 is unidirectional and the feeder link (e.g., H2Sat 300 to gateway station 320) consists of a single beam supporting only a single gateway station 320. Further drawbacks of the H2Sat 300 include susceptibility to rain attenuation on the feeder link and an inability for the H2Sat 300 to directly relay data to desired target ground terminals in the absence of the gateway station 320.

It is desirable to provide a geostationary high throughput satellite for relaying data between several orbiting LEO satellites and one or more ground terminals for increasing the duration of time that each respective LEO satellite can transmit data to one or more ground stations. Such high throughput satellites and methods of operating high throughput satellites are now provided.

In a conventional fixed-satellite service (FSS) system, one or several large spot beams (e.g., a semi-global beam for C-band and a selected number of regional beams for Ku-band) are typically used to cover desired spot beam coverage area.

With a high throughput satellite (HTS) system, a satellite utilizes multiple narrow spot beams (e.g., 0.6 deg Ka-band or Ku-band beams). The spot beams are arranged in a pattern to cover a desired area. Example HTS systems rely on "color re-use". Different portions of frequency spectrum used by different spot beams, or the same portion but using a different polarization, are referred to as different "colors". That is, each color represents a segment of spectrum with a bandwidth and polarization that can be utilized by a satellite or end user within the coverage area of the respective spot beam. When using spatial separation, each color can be re-used by multiple spot beams to increase the HTS system capacity. In some examples, the HTS system may be configured to minimize interference in both downlink and uplink signals by configuring use of adjacent beams having different colors.

In some scenarios, while utilizing fewer colors can lead to higher inter-beam interference, especially at regions near the edge of coverage (EOC), the overall system throughput may be higher as more bandwidth is allocated to each coverage area. An example HTS system design may use a 4-color reuse scheme; but some other systems may have 2-colors, 6-colors, 8-colors, or more. In some examples, a 2-color reuse pattern can result in some adjacent beams using the same color.

Figure 4:
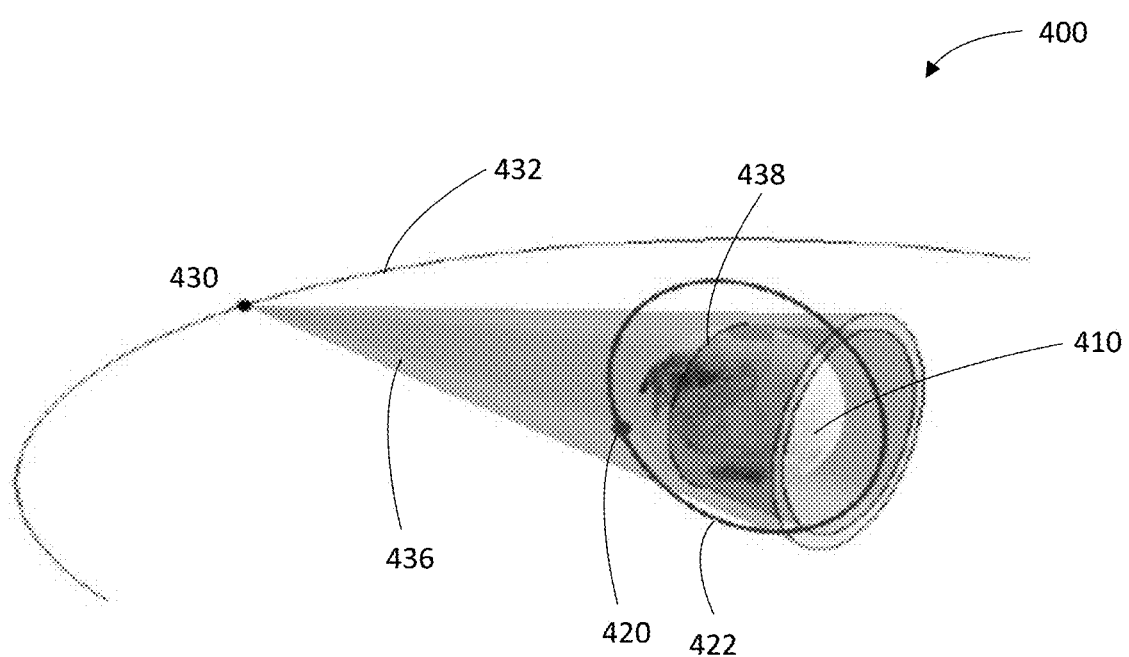
FIG. 4 illustrates a satellite system for relaying data, in accordance with an example of the present application.

Reference is now made to FIG. 4, which illustrates a satellite system 400 for relaying data, in accordance with an example of the present application. FIG. 4 illustrates the Earth 410 and a LEO satellite 420, such as an Earth observation satellite, and a corresponding orbit path 422 around the Earth 410. The LEO satellite 420 may orbit the Earth at an altitude in the range of 300 to 1,000 km above the Earth's surface. The LEO satellite 420 is configured to establish a communication link with one or more identified ground stations for TT&C and for transmitting Earth or space observation data to the identified ground stations. As described, the LEO satellite 420 may be configured to capture and store observation data and, when the LEO satellite 420 establishes line-of-sight visibility with a target ground station (not illustrated in FIG. 4), the LEO satellite 420 may transmit the stored observation data to the ground station. As the duration of time that the LEO satellite 420 will have line-of-sight visibility with the identified ground stations for data transmission and reception is in the range of 5 to 15 minutes per orbit of the Earth and as the amount of EO data can be large, the duration of time required to transmit observation data to the target ground station can exceed the duration of time that the LEO satellite has line-of-sight visibility with the target ground station.

To supplement the communication link between the LEO satellite 420 and the identified ground station for data transmission, the satellite system 400 includes a high throughput satellite 430 for relaying data between the LEO satellite 420 and the target ground station. In FIG. 4, the high throughput satellite 430 has a geostationary orbit 432 about the Earth. The example high throughput satellite 430 is equipped with a plurality of spot beams for transmitting and receiving data. The plurality of spot beams provides a spot beam coverage area 438. Each spot beam has a beamwidth that results in a coverage area of each respective spot beam at the surface of the Earth. In FIG. 4, the collection of the plurality of spot beams results is illustrated as a spot beam collective 436 and maps to a spot beam coverage area 438 at the surface of the Earth 410.

Figure 5:
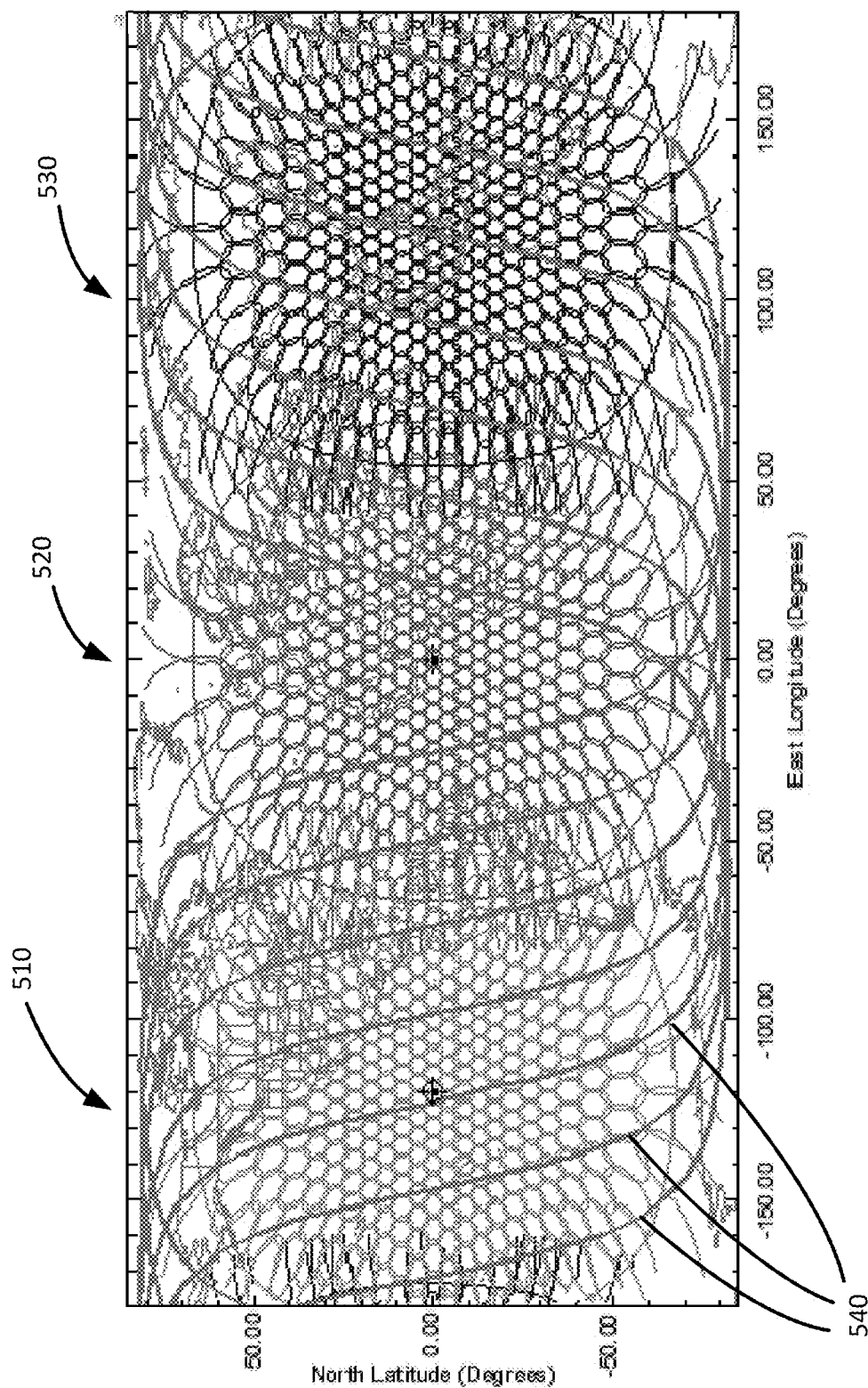
FIG. 5 illustrates spot beam coverage areas provided by respective high throughput satellites, in accordance with an example of the present application.

Reference is now made to FIG. 5, which illustrates several spot beam coverage areas provided respectively by several example high throughput satellites, in accordance with an example of the present application. FIG. 5 illustrates an example first spot beam coverage area 510 provided by a first high throughput satellite, an example second spot beam coverage area 520 provided by a second high throughput satellite, and an example third spot beam coverage area 530 provided by a third high throughput satellite. The first spot beam coverage area 510 can correspond to the spot beam coverage area 438 illustrated in FIG. 4 that is provided by the high throughput satellite 430. Each of the respective high throughput satellites may be geostationary satellites orbiting the Earth and are positioned at individual orbital slots. Collectively, the high throughput satellites can provide spot beams that provide data communication links with other endpoint devices that may be located throughout the Earth's surface. In FIG. 5, the spot beam coverage areas can include single-band spot beams such as Ka-band spot beams, Q-band spot beams, or V-band spot beams.

In FIG. 5, each spot beam has a beamwidth that results in a coverage area at the surface of the Earth, as indicated by the individual circles. The spot beams provide circular coverage areas; however, it can be appreciated that the spot beams may provide a spot beam coverage area at the surface of the Earth that may appear elliptical in shape at the Earth's surface. Although the coverage areas are indicated as isolated circles, each respective beam gain pattern extends beyond the indicated circle. The illustrated circle may indicate a −3 dB boundary, for example.

In the example coverage areas illustrated in FIG. 5, color re-use may be employed to minimize interference. If enough colors are used, adjacent beams (i.e., adjacent coverage areas for spot beams) do not use the same color, which assists in reducing inter-beam interference. In some examples, the high throughput satellites may feature hundreds of spot beams. Spot beams are provided to support both forward (ground terminal to high throughput satellite to LEO satellite) and return (LEO satellite to high throughput satellite to ground terminal) communication links. Through color re-use, many beams can use the same frequency and polarization and inter-beam interference is managed through spatial separation of the coverage areas for respective spot beams. It can be appreciated that use of a large number of colors may result in limited bandwidth being allocated to each spot beam, negatively impacting throughput. Color re-use patterns with fewer colors can improve the bandwidth available to each spot beam, but at a cost of higher inter-beam interference. Higher inter-beam interference can adversely impact the achievable throughput of the system and can lower spectrum efficiency. Accordingly, high throughput satellite systems are implemented with fixed color re-use patterns that attempt to balance the above described factors.

FIG. 5 also illustrates example orbit trajectories 540 of one or more LEO satellites. The orbit trajectories 540 are illustrated as an overlay on the spot beam coverage areas provided by respective high throughput satellites (described above).

Figure 6:
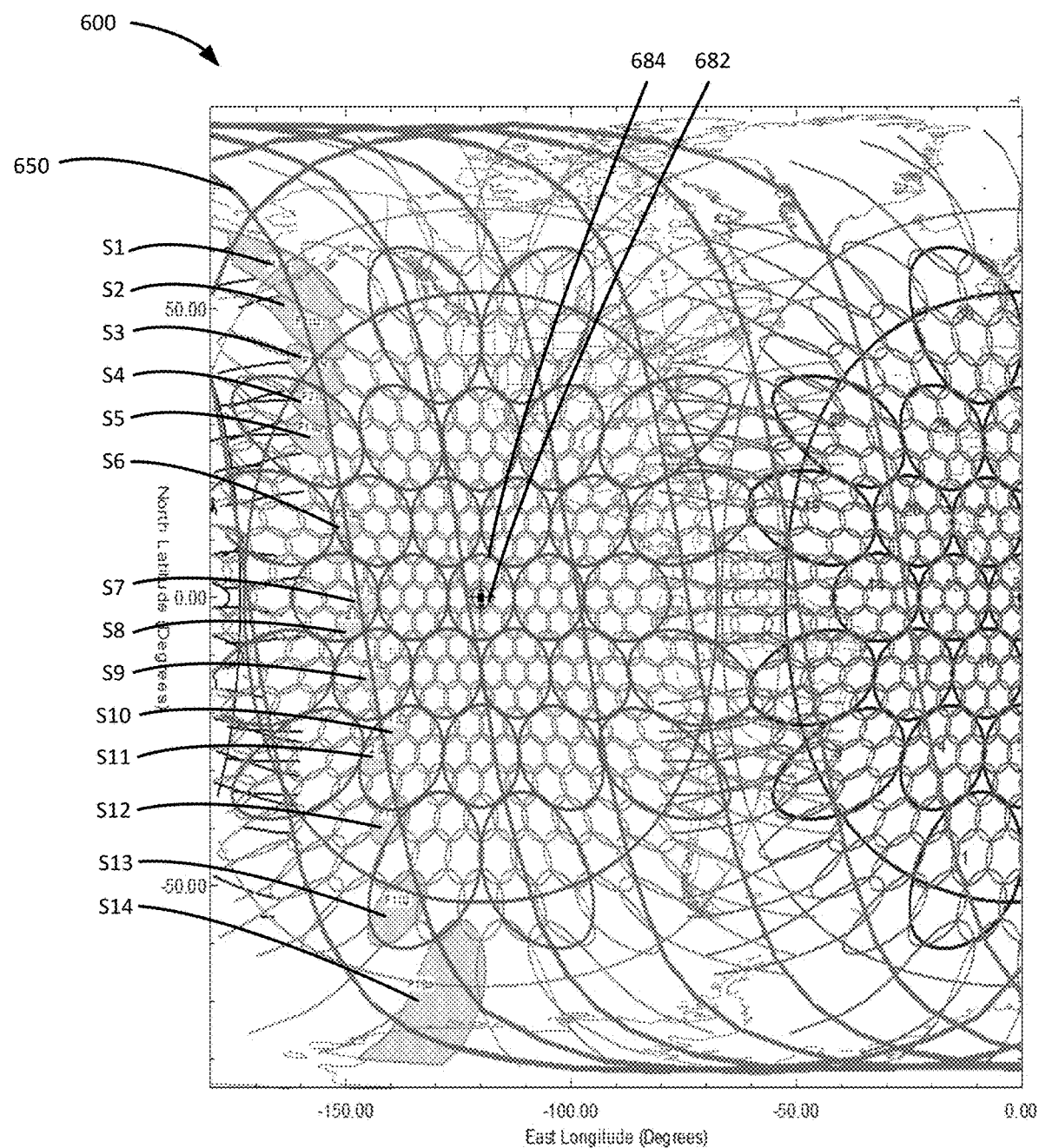
FIG. 6 illustrates a spot beam coverage area including single-band spot beams and multi-band spot beams provided by a high throughput satellite, in accordance with another example of the present application.

Reference is made to FIG. 6, which illustrates a spot beam coverage area 600 provided by a high throughput satellite, in accordance with an example of the present application. The example multi-spot beam coverage area 600 can include a collection of single-band spot beams and multi-band spot beams. For example, the spot beam coverage area 600 can be provided using Ka-band spot beams which are illustrated as smaller circles. Further, the spot beam coverage area 600 can also be provided using Q-band spot beams that are concentric with Ka-band spot beams or provided using V-band spot beams that are concentric with Ka-band spot beams. In some examples, the beamwidth of the Q-band spot beams or the V-band spot beams may be larger than the beamwidth of the Ka-band spot beams.

The collection of single-band spot beams and multi-band spot beams can provide the spot beam coverage area 600 and the high throughput satellite may support communication links with LEO satellites (e.g., inter-satellite links) using Ka-band, Q-band, V-band, or other frequency bands as desired.

As described, a respective high throughput satellite can be configured to provide a plurality of single-band spot beams (see e.g., FIG. 5) or a collection of both single-band spot beams and multi-band spot beams (see e.g., FIG. 6) for a spot beam coverage area. As will be described when the high throughput satellite provides multiple spot beams for the spot beam coverage area 600, the high throughput satellite may simultaneously relay data between multiple LEO satellites and multiple target ground terminals. Further, because the high throughput satellite relays data from the respective LEO satellites to one or more target ground terminals, the duration of time that respective LEO satellites may communicate with one or more target ground terminals may be greater than when the respective LEO satellites transmit data directly to the one or more target ground terminals.

In FIG. 6, example single-band spot beams are identified with reference numbers ranging from S1 to S14. In some examples, the single-band spot beams may be Ka-band spot beams. In FIG. 6, some of the spot beams intersect with the orbiting trajectory of a LEO satellite. When the LEO satellite orbits the Earth, the LEO satellite can include a tracking antenna for tracking the high throughput satellite (e.g., geostationary). As the LEO satellite orbits the Earth, the LEO satellite may enter and, subsequently, exit successive coverage areas of individual spot beams along the path of LEO satellite orbit.

When the LEO satellite orbits the Earth, the high throughput satellite may establish an inter-satellite communication link with the first spot beam identified with reference numeral S1 (FIG. 6). As the LEO satellite continues along the orbiting trajectory path, the high throughput satellite may handover or transition the inter-satellite communication link to a subsequent spot beam, such as the spot beam identified with reference numeral S2, and subsequently to spot beams identified with reference numerals S3 to S14.

A high throughput satellite may be configured to provide a single-band (e.g., Ka-band) spot beam having a beamwidth in the range of 0.6 to 1.2 degrees and having a spot beam diameter in the range of 400 to 900 kilometers. A given LEO satellite may be orbiting the Earth at a high rate of speed that causes the LEO satellite to enter and, subsequently, exit respective coverage areas of spot beams within a short duration of time. Because a given LEO satellite may be orbiting the Earth at a relatively high rate of speed, to maintain the inter-satellite link between the high throughput satellite and the given LEO satellite for data communication, frequent spot-beam handover within the spot beam coverage area (e.g., spot beam coverage area 600 of FIG. 6) may be required. To minimize the number of occurrences of spot-beam handover operations, the high throughput satellite could be configured to provide single-band (e.g., Ka-band) spot beams having a larger beamwidth. However, spot-beams with larger beamwidths may have poorer antenna gain-to-noise-temperature (G/T) ratios as compared to spot-beams with smaller beamwidths.

The poorer antenna G/T ratios can result in degraded communication link performance. Thus, it may be desirable to provide high throughput satellites and methods for operating the high throughput satellites for efficiently handling spot-beam handover when a given LEO satellite orbits the Earth and travels through the spot beam coverage area (e.g., spot beam coverage area 600 of FIG. 6).

Figure 7:
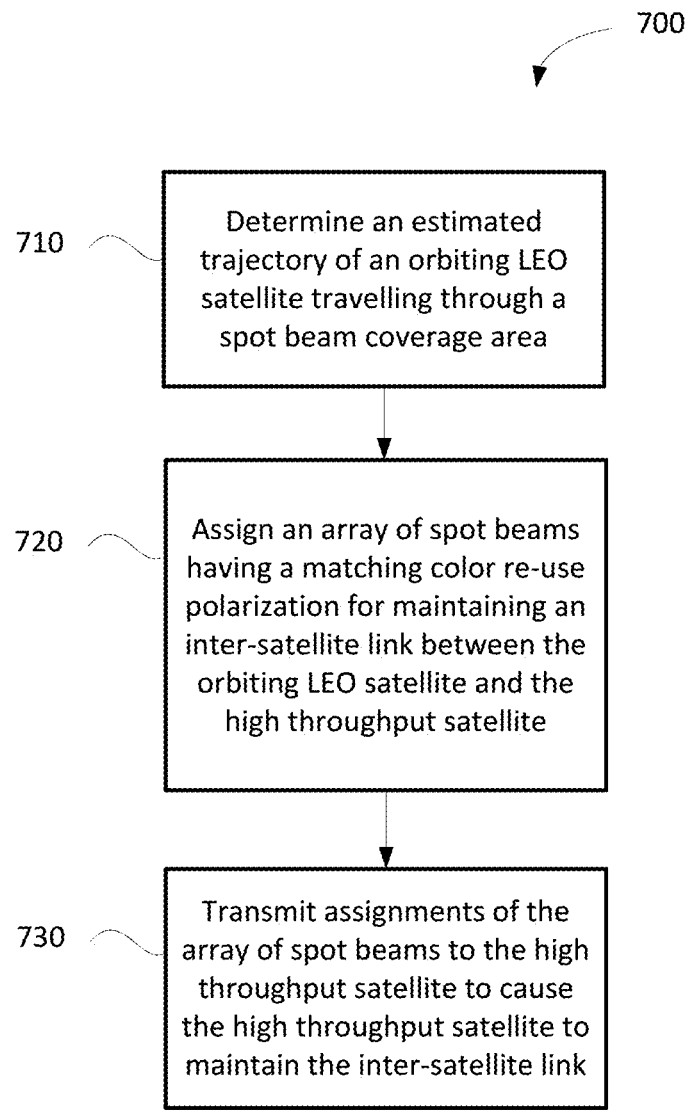
FIG. 7 illustrates, in flowchart form, a method of operating a high throughput satellite for relaying data between one or more low earth satellites and a target ground station, in accordance with an example of the present application.

Reference is now made to FIG. 7, which illustrates, in flowchart form, a method 700 of operating a high throughput satellite for relaying data between one or more LEO satellites and a target ground station, in accordance with an example of the present application. An example high throughput satellite can include the high throughput satellite 430 illustrated in FIG. 4 in a geostationary orbit relative to the Earth 410 (FIG. 4). The example high throughput satellite provides a plurality of spot beams for a spot beam coverage area. The spot beam coverage area can include a collection of single-band coverage areas for respective spot beams as illustrated in FIG. 5 (e.g., respective spot beam coverage areas identified with reference numeral 510, 520, or 530) or a collection of single-band coverage areas and multi-band coverage areas for respective spot beams as illustrated in FIG. 6. The method 700 of FIG. 7 includes operations that are carried out by one or more processors at a ground network operations center (NOC) or a ground station.

At operation 710, the processor determines an estimated trajectory of an orbiting LEO satellite travelling through the spot beam coverage area. For example, in FIG. 6, the estimated trajectory of the orbiting LEO satellite may be the trajectory visually depicted and identified with reference numeral 650. The trajectory of the orbiting LEO satellite may include a set of latitude/longitude information associated with a running list of time information. In some examples, the network operations center or ground station may estimate the trajectory of the orbiting LEO satellite based on the orbital path of the LEO satellite at prior points in time.

As described, the high throughput satellite may utilize color re-use schemes for reducing inter-beam interference. That is, color-reuse schemes can utilize different portions of frequency spectrum and/or different polarizations for reducing inter-beam interference. Because the duration of time required for the high throughput satellite utilizing frequency transition to handover communication links from a given spot beam in the spot beam coverage area to a subsequent spot beam may be less than when the high throughput satellite utilizes polarization transition, it is desirable for the high throughput satellite to utilize frequency transition when handing over communication links from a given spot beam to a subsequent spot beam.

At operation 720, the processor may assign, based on the estimated trajectory of the orbiting LEO satellite, a plurality of assigned spot beams having a matching color re-use polarization for maintaining an inter-satellite link between the orbiting LEO satellite and the high throughput satellite as the orbiting LEO satellite travels through the spot beam coverage area. As described, because a given LEO satellite may be orbiting the Earth at a high rate of speed, the LEO satellite may enter and, subsequently, exit a respective coverage area of a spot beam in a short duration of time. As the orbiting LEO satellite may be within the respective coverage area of a particular spot beam for a specific duration of time, the specific duration of time may be less than the duration of time needed if communication link handover using polarization transition was used. If the high throughput satellite utilizes polarization transition, once communication link handover is completed from a given spot beam to a subsequent spot beam, the LEO satellite may already have travelled to further subsequent spot beams in the LEO satellite trajectory. To ameliorate the challenges associated with using polarization transition, the processor assigns one or more subsequent spot beams having the matching color re-use polarization for maintaining the inter-satellite link.

To illustrate, as described with reference to FIG. 6, when the LEO satellite orbits the Earth, the high throughput satellite may establish an inter-satellite communication link with the first spot beam identified with reference numeral S1 (FIG. 6). The high throughput satellite can identify, based on the estimated trajectory of the orbiting LEO satellite, when the orbiting LEO satellite may approach the −3 dB gain boundary or travel outside the −3 dB boundary of the first spot beam S1. Based on spot beam assignments received from the ground network operations center, the high throughput satellite can identify that a subsequent spot beam, such as the spot beam identified with reference numeral S2 (FIG. 6), is along the estimated trajectory of the orbiting LEO satellite and enable that subsequent spot beam having a color re-use polarization that matches the first spot beam S1.

That is, if that subsequent spot beam (S2) has a color re-use polarization that matches the first spot beam S1, the network operations center can assign that subsequent spot beam (S2) to be in the assigned plurality of spot beams for maintaining the inter-satellite link between the orbiting LEO satellite and the high throughput satellite. The processor of the network operations center can iteratively determine which spot beams in the plurality of high throughput satellite spot beams have a matching color re-use polarization that may be assigned for maintaining the inter-satellite link between the particular orbiting LEO satellite and the high throughput satellite.

In some examples, the processor at the network operations center can determine and assign an available frequency slot in the respective assigned one or more subsequent spot beams (described above) that has the same color re-use polarization for the anticipated time that the orbiting LEO satellite will enter the respective assigned subsequent spot beam. That is, the processor may determine, based on a spot beam coverage area satellite traffic status report, an available frequency slot and time associated with the available frequency slot, and can assign that available frequency slot to a respective LEO satellite.

In some examples, prior to assigning the plurality of assigned spot beams for maintaining the inter-satellite link, the processor at the network operations center overlays a spot beam coverage area map for the high throughput satellite on the determined estimated trajectory of the orbiting LEO satellite for identifying the one or more subsequent spot beams available for maintaining the inter-satellite link. For example, referring again to FIG. 6, the processor may overlay the determined estimated trajectory 650 of the orbiting LEO satellite on the spot beam coverage area 600 associated with the high throughput satellite. In some examples, the spot beam coverage area 600 may be associated with information regarding frequency spectrum portions and polarization for the individual spot beams such that the processor may graphically identify the one or more subsequent spot beams having a matching color re-use polarization for use to maintain the inter-satellite link as the orbiting LEO satellite travels through the spot beam coverage area.

When the number of inter-satellite links between the high throughput satellite and respective LEO satellites is large, it can be challenging to graphically and/or visually identify the one or more required subsequent spot beams, described above. As an alternative, in some examples, the processor aggregate or collect trajectory information for the LEO satellites and information on frequency spectrum portions and polarization associated with the individual spot beams. The processor may, subsequently, determine based on the collected information the one or more subsequent spot beams having a matching color re-use polarization for maintaining the inter-satellite link.

In some scenarios, when numerous trajectories of respective LEO satellites pass through a portion of the spot beam coverage area that is provided by the high throughput satellite, that particular portion of the spot beam coverage area may include a dense demand for communication links. To ameliorate challenges associated with non-uniform distribution of communication link demand across the spot beam coverage area, in some examples, the high throughput satellite can support dynamic beamforming. When the high throughput satellite supports beamforming, prior to assigning the plurality of assigned spot beams for maintaining the inter-satellite link (e.g., operation 720), the processor may re-configure the plurality of assigned spot beams of the spot beam coverage area in response to determining that a number of inter-satellite links between the high throughput satellite and a plurality of respective LEO satellites is greater than a threshold number. That is, the processor can utilize beamforming operations for providing a re-configured spot beam coverage area to alleviate challenges associated with the existing spot beam coverage area experiencing non-uniform distribution of data throughput demand for establishing or maintaining inter-satellite links.

At operation 730, the processor transmits assignments of the plurality of assigned spot beams to the high throughput satellite to cause the high throughput satellite to maintain the inter-satellite link via a first spot beam and one or more subsequent assigned spot beams having the matching color re-use polarization. Transition of the inter-satellite link from the first spot beam to the one or more assigned subsequent spot beams utilizes frequency transition. It can be appreciated that when the network operations center transmits assignments of the plurality of assigned spot beams to the high throughput satellite, the high throughput satellite can schedule configurations of the respective spot beams (e.g., frequency slot, gain setting, etc.) for establishing or enabling the inter-satellite link at a time that the LEO satellite is anticipated to be within the boundary of the respective spot beams.

In some examples, the processor of the ground NOC can amend modulation and coding (MODCOD) operations. The processor may monitor feeder link performance and, in response to degrading or fluctuating feeder link performance, the processor may alter MODCOD operations for maintaining the feeder link performance to mitigate rain fade or other weather conditions by requesting the LEO to change the MODCOD of on-board modem shown in FIG. 9. Altering MODCOD operations is based on adaptive coding and modulation (ACM) functions of DVB-S2 or DVB-S2X standards at the ground NOC modem. For example, the ground NOC modem can transmit feeder link performance status information to a LEO satellite modem, and the ground NOC modem can transmit commands to the LEO satellite such that the LEO satellite may alter MODCOD operations for maintaining the feeder link at a desired performance level.

The high throughput satellite described herein provides spot beams for a spot beam coverage area. The respective spot beams for providing the inter-satellite link can support data communication using at least one of Ka-band, Q-band, or V-band frequency spot beams. Referring again to FIG. 5, the plurality of spot beams for the first spot beam coverage area 510, the second spot beam coverage area 520, or the third spot beam coverage area 530 can be any one of Ka-band, Q-band, or V-band frequency spot beams.

In another example, the respective spot beams for the spot beam coverage area can include a combination of single-band spot beams and multi-band spot beams. For example, referring again to FIG. 6, the plurality of spot beams for the spot beam coverage area 600 can include a combination Ka-band/Q-band multi-band spot beams or Ka-band/V-band multi-band spot beams. That is, the high throughput satellite can include a plurality of spot beam antennas or feeds, where each spot beam antenna can provide one or more coverage areas. In some examples, a spot beam antenna or feed can provide a multi-band spot beam, where the spot beam antenna can generate a first frequency band spot beam and a second frequency band spot beam concentric with the first frequency band spot beam. In this example, the first frequency band spot beam can have a different beamwidth than the second frequency band spot beam.

To illustrate, reference is made again to FIG. 6, where the example spot beam coverage area 600 includes several multi-band spot beams. For ease of exposition, only a single multi-band spot beam is identified in FIG. 6. The identified multi-band spot beam can include a Ka-band spot beam 682 and a Q-band spot beam 684. Because the Q-band spot beam 684 has a larger beamwidth than the Ka-band spot beam 682, the number of spot beam antennas for providing Q-band spot beams 684 in the spot beam coverage area 600 may be less than the number of spot beam antennas for providing Ka-band spot beams. Although the example multi-band spot beam is described using Ka-band and Q-band, other ITU frequency bands may be implemented.

Figure 8:
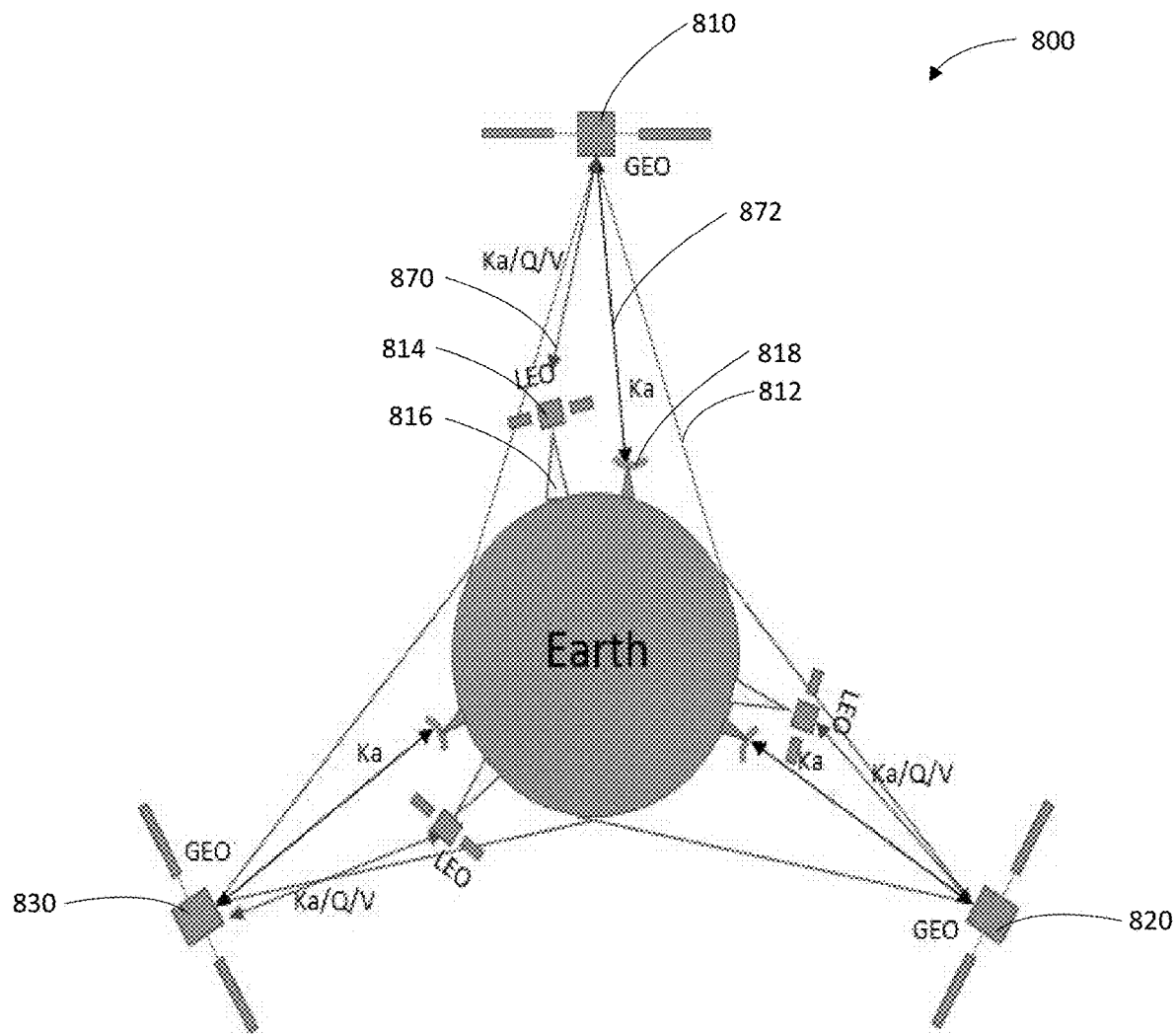
FIG. 8 illustrates a high throughput satellite system for relaying data, in accordance with an example of the present application.

Reference is now made to FIG. 8, which illustrates a HTS system 800 for relaying data between one or more LEO satellites and one or more target ground stations, in accordance with an example of the present application.

The HTS system 800 includes a first high throughput satellite 810. The first high throughput satellite 810 can be a geostationary satellite. The first high throughput satellite 810 can provide a plurality of spot beams for providing a first spot beam coverage space 812. The first spot beam coverage space 812 includes a combination of spot beams arranged to provide a first spot beam coverage area, for example, at the surface of the Earth.

As illustrated in FIG. 8, a first LEO satellite 814 is within the boundary of the first spot beam coverage space 812. Thus, the first high throughput satellite 810 may establish an inter-satellite link 870 with the first orbiting LEO satellite 814. Further, as illustrated in FIG. 8, a first ground terminal 818 is within the boundary of the first spot beam coverage space 812. The first high throughput satellite 810 may establish a first feeder link 872 with the first ground terminal 818.

As described herein, LEO satellites can capture and store earth observation data and, subsequently, transmit the stored EO data when the LEO satellite has line-of-sight visibility with a target ground terminal. For example, in FIG. 8, the first LEO satellite 814 provides a first direct-to-ground terminal space 816, such that when the target ground terminal is within range of the direct-to-ground terminal space 816, the LEO satellite 814 may transmit data to the target ground terminal.

When the LEO satellite does not have line-of-sight visibility with the target ground terminal, the LEO satellite can continue storing captured data. As described herein, because the LEO satellite orbits at relatively low altitudes from the Earth's surface, the duration of time when the first ground terminal 818 may be within range of the direct-to-ground terminal space 816 may be in the range of 5 to 15 minutes. To ameliorate the disadvantages of relying solely on data transmission from the first LEO satellite 814 directly to the first ground terminal 818 in the duration of time when line-of-sight visibility is available, the first LEO satellite 814 can utilize a combination of: (1) the data transmission from the first LEO satellite 814 directly to the first ground terminal 818, when the first LEO satellite 814 has line-of-sight visibility with the first ground terminal 818; and (2) data relay via the first inter-satellite link 870 and the first feeder link 872 for increasing the duration of time available for (a) data transmission from the first LEO satellite 814 to the first ground terminal 818; and (b) data reception at the first LEO satellite 814 from the first ground terminal 818.

In FIG. 8, the example first high throughput satellite 810 includes the first spot beam coverage space 812 providing a spot beam coverage area spanning approximately one-third of the Earth's surface. If a second high throughput satellite 820 and a third high throughput satellite 830 are spaced in geostationary orbit slots that are substantially equidistant from a neighbouring high throughput satellite, the combination of the first high throughput satellite 810, the second high throughput satellite 820, and the third high throughput satellite 830 can relay data between a respective LEO satellite and a target ground station to provide a greater duration of time for data transmission than if the respective LEO satellite relied solely on a communication link within the boundary of the respective direct-to-ground terminal space (see e.g., the first direct-to-ground terminal space 816). The combination of the first high throughput satellite 810, the second high throughput satellite 820, and the third high throughput satellite 830 for relaying data can result in providing data communication transmission coverage for a substantial portion of the Earth's surface.

In the example HTS system 800 of FIG. 8, respective inter-satellite links support data communication using at least one of Ka-band, Q-band, and/or V-band frequency spot beams. Further, the respective feeder links support data communication using Ka-band frequency spot beams. In some examples, spot beams configured with other ITU frequency band signals can be implemented.

As an illustrative example, in FIG. 8, when an orbiting LEO satellite, such as the first LEO satellite 814, has line-of-sight visibility with the first high throughput satellite 810 via a first spot beam, an inter-satellite link is formed between the orbiting LEO satellite and the first high throughput satellite 810. Referring again to FIG. 6, the first spot beam can be the first spot beam identified with reference numeral S1.

In some examples, subsequent to the first LEO satellite establishing an inter-satellite link between the orbiting LEO satellite and the high throughput satellite, the processor of the ground NOC can identify a target ground station from a plurality of ground stations within the spot beam coverage area for supporting feeder link communications between the high throughput satellite and the target ground station. The orbiting LEO satellite can transmit information regarding the target ground station to the ground NOC, and the ground NOC can send commands to the high throughput satellite for instructing that a feeder link be established with the identified target ground station.

Because the high throughput satellite provides a plurality of spot beams for the spot beam coverage area 600, the ground NOC can instruct the high throughput satellite to establish a feeder link to support feeder link communication between the high throughput satellite and any of the ground stations that may be within the spot beam coverage area 600. In some examples, once the inter-satellite link is established, the orbiting LEO satellite may specify the particular ground terminal to which data is to be transmitted and the high throughput satellite can establish the feeder link with the target ground terminal. That is, a digital processor or a digital channelizer of the high throughput satellite can: (1) digitize incoming radio frequency signals received from a LEO satellite into respective sub-channels; and (2) route the individual sub-channels to the target ground station at desired gain and frequency settings.

The high throughput satellite can establish a feeder link using any number of frequency band spot beams. For example, to mitigate or reduce weather effects or rain attenuation on the feeder link, the high throughput satellite may establish the feeder link using Ka-band spot beams or Ku-band spot beams. Ka-band spot beams or Ku-band spot beams may be less susceptible to rain attenuation than Q-band or V-band spot beams. Spot beams operating in frequency bands having higher frequencies are more susceptible to link degradation due to rain attenuation.

Further, to mitigate effects of rain attenuation, the high throughput satellite can be configured to utilize adaptive coding and modulation (ACM) and on-board digital routing. For example, ACM operations can mitigate rain attenuation effects by altering the Forward Error Correction (FEC) code and modulation to compensate for rain fade. In addition, the high throughput satellite can configure an on-board digital channelizer for routing data transmission to alternate ground terminals where rain attenuation effects may be less prevalent. Thus, the high throughput satellite may route, via an on-board digital channelizer, uplink data from an orbiting LEO satellite to (1) an existing feeder link associated with a target ground terminal of the high throughput satellite; or (2) an alternate feeder link with a different target ground terminal specified by the orbiting LEO satellite.

The respective spot beams for providing feeder links between the high throughput satellite and the ground station may support communication using at least one of Ka-band spot beams or Ku-band spot beams. Spot beams operating in other ITU frequency bands may also be used for providing the feeder link.

It can be appreciated that when an inter-satellite link is established between the LEO satellite and the high throughput satellite at the first spot beam, the LEO satellite may receive, via the high throughput satellite and from the ground NOC, information relating to assignment of the plurality of assigned spot beams having a matching color re-use polarization. The LEO satellite may also receive information relating to the spot beam coverage areas of the high throughput satellite. Thus, when the LEO satellite orbits the Earth along the planned LEO satellite trajectory, the LEO satellite may, based on global positioning system location information, configure the antennas of the LEO satellite to alter its frequency of transmission or reception of data as the LEO satellite travels into and away from respective spot beams of the spot beam coverage areas.

Figure 9:
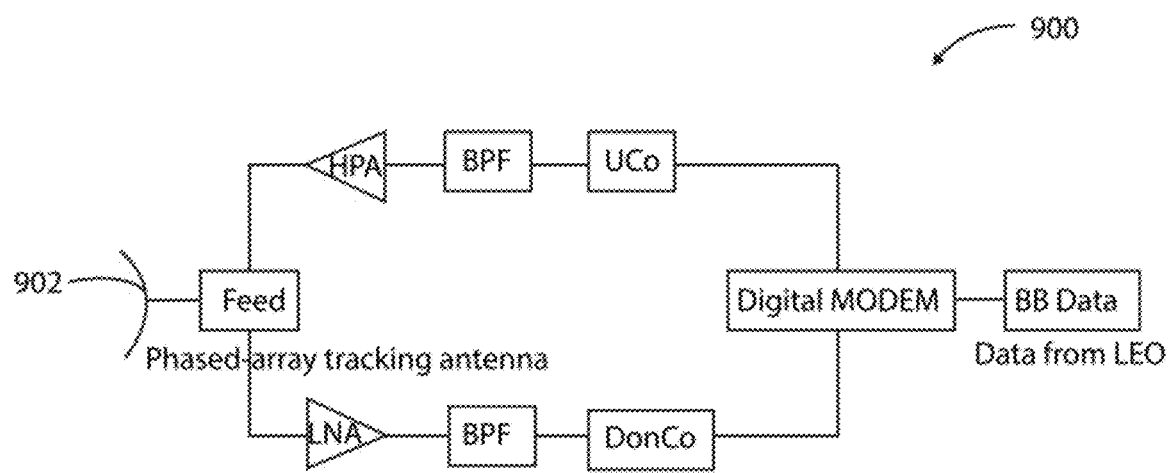
FIG. 9 illustrates a simplified block diagram of a radio-frequency payload for a LEO satellite, in accordance with an example of the present application.

Reference is now made to FIG. 9, which illustrates a simplified block diagram of an example radio-frequency payload 900 installed on an example LEO satellite, in accordance with an example of the present application. Example LEO satellites, such as the first LEO satellite 814 of FIG. 8, can be equipped with a tracking antenna 902 for tracking a high throughput satellite when the first LEO satellite 814 travels along its orbit path. In some examples, the tracking antenna 902 can include mechanical antenna turning mechanisms, switched beams, reflector arrays, phased arrays, di-electric lensing, or metamaterial arrays. In some examples, the rotation speed of the tracking antenna can be 10 degrees/second or faster.

In FIG. 9, the example tracking antenna 902 is a phased-array tracking antenna. The phased-array tracking antenna can utilize constructive interference of an array of antennas of which individual antennas are phase shifted. The example radio-frequency payload 900 can include one or more filters, such as band pass filters (BPF), and one or more amplifiers, such as high-power amplifiers (HPA) or low-noise amplifiers (LNA). The example radio-frequency payload 900 may also include an Up Converter (UCo) and a Down Converter (DonCo).

Figure 10:
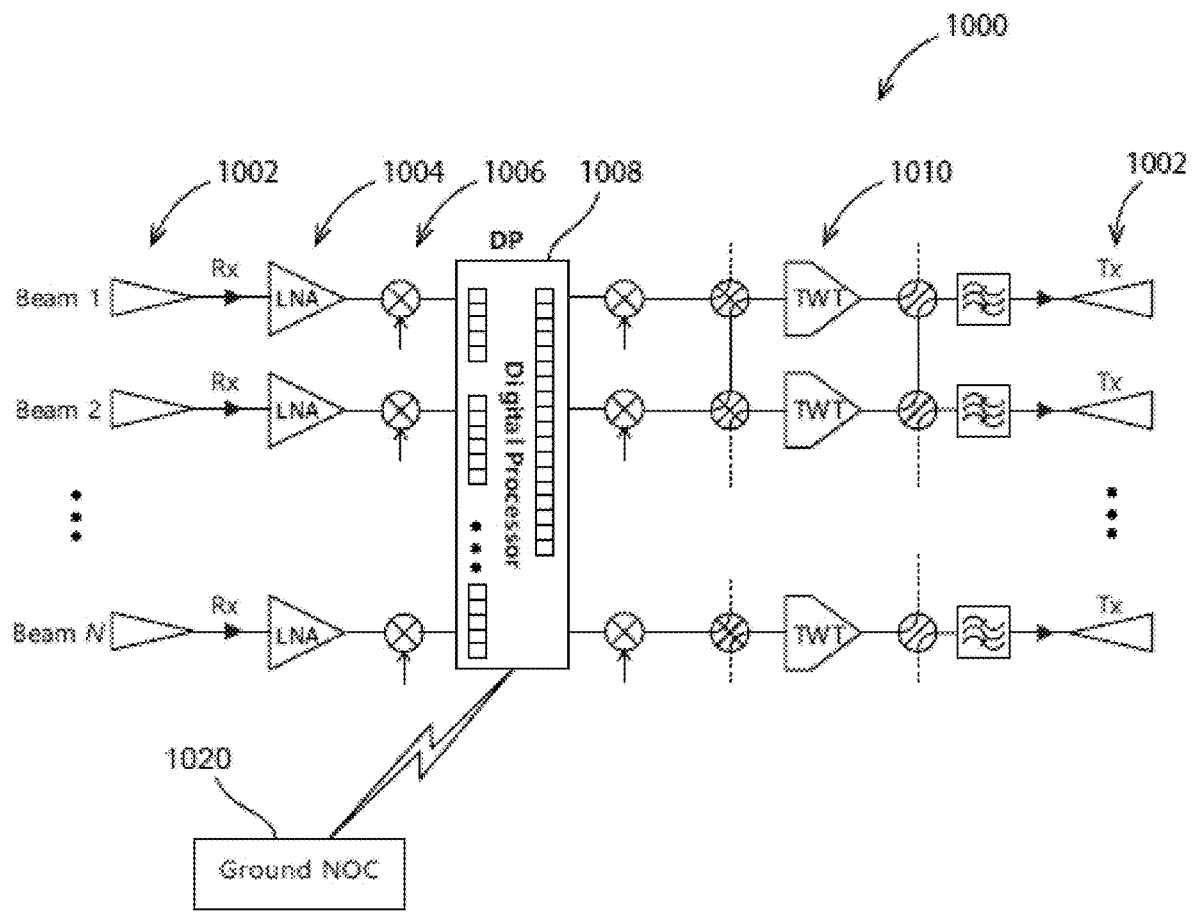
FIG. 10 illustrates, in block diagram form, an example high throughput satellite payload, in accordance with an example of the present application.

Reference is now made to FIG. 10, which illustrates, in block diagram form, an example high throughput satellite payload 1000. The high throughput satellite payload 1000 includes N spot beam antennas 1002. The high throughput satellite payload 1000 includes a plurality of feeds providing a plurality of spot beams for a spot beam coverage area. The plurality of feeds can transmit or receive radio frequency signals from orbiting LEO satellites, ground terminals, or other endpoints.

Signals received in one of the spot beam antennas 1002 are amplified by low noise amplifiers (LNA) 1004, down-converted in mixers 1006, and input to a digital processor (DP) 1008. The digital processor 1008 digitizes the down-converted spectrum to produce digitized spectrum to enable fast analysis and switching operations, including channel switching or reassignment. Generally, the digital processor 1008 can digitize incoming or detected radio-frequency signals into individual sub-channels and route the individual sub-channels to desired downlink spots with configured gain settings and in accordance with frequency slot allocations. The digitized channels are output by the digital processor 1008 for up-conversion, amplification (typically via traveling wave tube 1010), and transmission via the antennas 1002.

The digital processor 1008 may also implement one or more operations for relaying data between one or more low earth orbit (LEO) satellites and a target ground station. For example, the digital processor 1008 can receive, from ground NOC or ground terminals, assignments of a plurality of assigned spot beams for maintaining an inter-satellite link between an orbiting LEO satellite and the high throughput satellite payload 1000 as the orbiting LEO satellite travels through a spot beam coverage area provided by the high throughput satellite payload 1000. The digital processor 1008 can configure a plurality of assigned spot beams having a matching color re-use polarization for maintaining the inter-satellite link as the orbiting LEO satellite travels through the spot beam coverage area. The digital processor 1008 can establish the inter-satellite link with the orbiting LEO satellite via a first spot beam of the plurality of assign spot beams. Further, the digital processor 1008 can transition the inter-satellite link from the first spot beam to subsequent assigned spot beams having the matching color re-use polarization as the LEO satellite travels through the spot beam coverage area. That is, the digital processor 1008 can configure the first spot beam and subsequent assigned spot beams at respective and successive points in time based on assigned frequency slots or gain settings for enabling and establishing inter-satellite links with the orbiting LEO satellite as it travels through the first spot beam and subsequent assigned spot beams.

In some examples, the high throughput satellite can be configured to establish inter-satellite and feeder links according to the specifications summarized in Table 1.

TABLE 1

| ISL/Feeder Link | Frequency | Access Scheme |
|---|---|---|
| ISL (LEO-to-GEO HTS) | Ka-band/Ka-band & Q-band multi-band spot beams; OR Ka-band/Ka-band & V-band multi-band spot beams | Support multiple users for data and telemetry delivery |
| Feeder link (GEO HTS-to-Ground) | Ka-band spot beams | |
| Feeder link (Ground-to-GEO HTS) | Ka-band spot beams | Support multiple users for sending commands to LEO |
| ISL (GEO HTS-to-LEO) | Ka-band/Ka-band & Q-band multi-band spot beams; OR Ka-band/Ka-band & V-band multi-band spot beams | |

The high throughput satellite payload 1000 may communicate with a ground network operations center (NOC) 1020, or sometimes known as a ground terminal, by way of high-speed telemetry and command link for communicating metadata and connection parameters to the ground network operations center 1020, and for receiving configuration and settings instructions from the network operations center 1020. The network operations center 1020 may include one or more servers and software for implementing a network management function to manage the configuration and traffic flow of the high throughput satellite payload 1000.

The network operations center 1020 may implement a portion or all of the operations of the methods described herein. For example, the network operations center 1020 may be implemented for controlling operation of a high throughput satellite relaying data between one or more LEO satellites and a target ground station. The network operations center 1020 includes a high speed telemetry and command link to the high throughput satellite, a processor, and memory storing processor-executable instructions that, when executed by the at least one processor, cause the processor to: determine an estimated trajectory of an orbiting LEO satellite travelling through the spot beam coverage area; assign, based on the estimated trajectory, a plurality of assigned spot beams having a matching color re-use polarization for maintaining the inter-satellite link between the orbiting LEO satellite and the high throughput satellite as the orbiting LEO satellite travels through the spot beam coverage area; and transmit assignments of the plurality of assigned spot beams to the high throughput satellite to cause the high throughput satellite to maintain the inter-satellite link via a first spot beam and one or more subsequent assigned spot beams having the matching color re-use polarization. Transition of the inter-satellite link from the first spot beam to the one or more assigned subsequent spot beams utilizes frequency transition.

In some examples, the downloadable data volume when a LEO satellite completes one pass or orbit about the Earth can be in the range of 400 to 900 gigabits per pass. The downloadable data volume can be dependent on spot beam frequency bands implemented, uplink equivalent isotropically radiated power (EIRP) associated with the LEO satellite, antenna gain-to-noise-temperature (G/T) associated with the LEO satellite, antenna size at the ground terminal for receiving data communications, available bandwidth at the high throughput satellite, and the duration of time available for direct data transmission from the LEO satellite to the target ground terminal.

As described, the network operations center 1020 may be implemented using one or more processors executing machine-readable instructions for causing the one or more processors to carry out the described operations.

In an illustrative example, a high throughput satellite may be implemented with the below detailed inter-satellite link and feeder link budget at different bandwidths, as summarized in Table 2. Table 2 provides example downloadable data volume estimates on each LEO satellite orbit about the Earth. For example, when Ka-band spot beams are used with 72 MHz bandwidth for data delivery, the volume of downloadable data per LEO satellite orbit about the Earth is approximately 430 Gbits. When higher bandwidths are used, the volume of downloadable data per LEO satellite orbit about the Earth is greater.

TABLE 2

| ISL Link (LEO-to-GEO) | | | | |
| --- | --- | --- | --- | --- |
| Carrier Frequency (GHz) | 30.0 | 30.0 | 30.0 | Ka-band |
| LEO Tx Ant. Diam. (cm) | 40.0 | 40.0 | 40.0 | |
| LEO Tx pwr (W) | 50.0 | 50.0 | 50.0 | |
| LEO EIRP (dBW) | 55.3 | 55.3 | 55.3 | |
| Bandwidth (MHz) | 72.0 | 125.0 | 200.0 | Occupied BW |
| UL PSD (dBW/40 kHz) | 22.7 | 20.3 | 18.3 | |
| FSPL (dB) | 213.0 | 213.0 | 213.0 | LEO-to-GEO |
| GEO G/T (dB/K) | 18.0 | 18.0 | 18.0 | HTS spot G/T |
| C/N (dB) | 11.3 | 8.9 | 6.8 | |

TABLE 2-continued

| Feeder link (GEO-to-Ground) | | | | |
| --- | --- | --- | --- | --- |
| Carrier frequency (GHz) | 20.0 | 20.0 | 20.0 | Ka-band |
| GEO EIRP/cxr (dBW) | 48.6 | 51.0 | 53.0 | |
| DL EIRP density (dBW/Hz) | −30.0 | −30.0 | −30.0 | |
| FSPL (dB) | 209.6 | 209.6 | 209.6 | GEO-to-Ground |
| Rain fade at 99.9% link avail. (dB) | 10.0 | 10.0 | 10.0 | |
| Atmospheric loss (dB) | 1.5 | 1.5 | 1.5 | |
| 7 m Gateway G/T (dB/K) | 34.9 | 34.9 | 34.9 | |
| C/N (dB) | 13.4 | 13.4 | 13.4 | |
| Total C/N (dB) | 9.2 | 7.5 | 6.0 | |
| Spectral Efficiency (bit/sym) | 2.1 | 1.9 | 1.6 | DVB-S2 EN_30230702v010101a |
| Downloadable Data per Pass (Gb) | 430.0 | 659.9 | 917.2 | Transmittable data per pass within available time window |

The example high throughput satellites and methods of operating high throughput satellites described herein can facilitate data relay operations between multiple LEO satellites and one or more target ground stations at a given time. Further, the method of operating high throughput satellites described herein can ameliorate inefficiencies of a LEO satellite transmitting data from the LEO satellite to a target ground terminal only during such time that the LEO satellite has line-of-sight visibility with the target ground terminal. By utilizing a combination of (1) data transmission from a LEO satellite direction to a target ground terminal when the LEO satellite has line-of-sight visibility with the target ground terminal; and (2) data relay via a high throughput satellite, the duration of time for transmitting data from the LEO satellite to the target ground terminal is increased compared to when data transmission occurs solely when the LEO satellite has line-of-sight visibility with the target ground terminal. As an illustrating example, when the LEO satellite solely relies on data transmission to a target ground terminal when the LEO satellite has line-of-sight visibility with the target ground terminal, the duration of time available data transmission is typically in the range of 5 to 15 minutes per orbit of the Earth. When the LEO satellite relies on both data transmission based on line-of-sight visibility with the target ground terminal and data transmission via data relay by a high throughput satellite, the duration of time available data transmission can be on the order 60 minutes or more per orbit of the Earth.

The various embodiments presented above are merely examples and are in no way meant to limit the scope of this application. Variations of the innovations described herein will be apparent to persons of ordinary skill in the art, such variations being within the intended scope of the present application. Additionally, the subject matter described herein and in the recited claims intends to cover and embrace all suitable changes in technology.

The invention claimed is:

1. A method of operating a high throughput satellite for relaying data between one or more low earth orbit (LEO) satellites and a target ground station, the high throughput satellite providing a plurality of spot beams for a spot beam coverage area, the method comprising:
   determining an estimated trajectory of an orbiting LEO satellite travelling through the spot beam coverage area;
   identifying, based on the estimated trajectory, a set of spot beams in the plurality of spot beams having a matching color re-use polarization for maintaining an inter-satellite link between the orbiting LEO satellite and the high throughput satellite as the orbiting LEO satellite travels through the spot beam coverage area; and
transmitting information identifying the spot beams in the set of spot beams to the high throughput satellite to cause the high throughput satellite to maintain the inter-satellite link via a sequence of spot beams in the set having the matching color re-use polarization.

2. The method of claim 1, wherein transmitting includes transmitting a command to the high throughput satellite to be relayed to LEO satellite to alter modulation and coding (MODCOD) operations at the LEO satellite.

3. The method of claim 2, further comprising monitoring performance status of a feeder link from the high throughput satellite to the target ground station, and wherein the transmitting a command is performed in response to the performance status of the feeder link.

4. The method of claim 3, wherein monitoring includes detecting degradation of the performance status and the command includes alterations to MODCOD operations to mitigate weather conditions that degrade the feeder link performance.

5. The method of claim 2, further comprising monitoring performance status of a feeder link from the high throughput satellite to the target ground station, and wherein transmitting includes transmitting feeder link performance status information to the high throughput satellite to be relayed to LEO satellite.

6. The method of claim 5, further comprising altering MODCOD operations at the LEO satellite based on the transmitted feeder link performance status information.

7. The method of claim 1, wherein the high throughput satellite includes an on-board digital processor, and wherein transmitting includes transmitting a command to the high throughput satellite to employ adaptive coding and modulation (ACM) and on-board digital routing using its on-board digital processor.

8. The method of claim 7, wherein ACM includes adaptive forward error correction and modulation to compensate for rain fade on a feeder link from the high throughput satellite to the target ground station.

9. The method of claim 1, further comprising, at the high throughput satellite, digitally channelizing uplink data from the LEO satellite received over the inter-satellite link and routing the digitally channelized uplink data to a different ground terminal specified by the LEO satellite.

10. The method of claim 9, wherein the routing is carried out in response to detection of a degraded feeder link to the target ground station.

11. A network operations center for controlling operation of a high throughput satellite relaying data between one or more low earth orbit (LEO) satellites and a target ground station, the high throughput satellite providing a plurality of spot beams for a spot beam coverage area, the network operations center comprising:
a high speed telemetry and command link to the high throughput satellite;
a processor; and
memory storing processor-executable instructions that, when executed by the processor, cause the processor to:
determine an estimated trajectory of an orbiting LEO satellite travelling through the spot beam coverage area;
identify, based on the estimated trajectory, a set of spot beams in the plurality of spot beams having a matching color re-use polarization for maintaining an inter-satellite link between the orbiting LEO satellite and the high throughput satellite as the orbiting LEO satellite travels through the spot beam coverage area; and
transmit information identifying the spot beams in the set of spot beams to the high throughput satellite to cause the high throughput satellite to maintain the inter-satellite link via a sequence of spot beams in the set having the matching color re-use polarization.

12. The network operations center of claim 11, wherein the instructions, when executed by the processor, cause the processor to transmit a command to the high throughput satellite to be relayed to LEO satellite to alter modulation and coding (MODCOD) operations at the LEO satellite.

13. The network operations center of claim 12, wherein the instructions, when executed by the processor, are to further cause the processor to monitor performance status of a feeder link from the high throughput satellite to the target ground station, and wherein the processor transmits the command in response to the performance status of the feeder link.

14. The network operations center of claim 13, wherein the processor monitors performance status by detecting degradation of the performance status and the command includes alterations to MODCOD operations to mitigate weather conditions that degrade the feeder link performance.

15. The network operations center of claim 12, further comprising monitoring performance status of a feeder link from the high throughput satellite to the target ground station, and wherein the processor transmits the command by transmitting feeder link performance status information to the high throughput satellite to be relayed to LEO satellite.

16. The network operations center of claim 15, wherein the command is to cause altered MODCOD operations at the LEO satellite based on the transmitted feeder link performance status information.

17. The network operations center of claim 11, wherein the high throughput satellite includes an on-board digital processor, and wherein the instructions, when executed by the processor, cause the processor to transmit a command to the high throughput satellite to employ adaptive coding and modulation (ACM) and on-board digital routing using its on-board digital processor.

18. The network operations center of claim 17, wherein ACM includes adaptive forward error correction and modulation to compensate for rain fade on a feeder link from the high throughput satellite to the target ground station.

19. A high throughput satellite comprising:
a plurality of feeds providing a plurality of spot beams for a spot beam coverage area; and
a digital processor to:
receive information identifying a set of spot beams in the plurality of spot beams for maintaining an inter-satellite link between an orbiting LEO satellite and the high throughput satellite as the orbiting LEO satellite travels through the spot beam coverage area;
configure, based on an estimated trajectory of the orbiting LEO satellite, a sequence of the spot beams in the set having a matching color re-use polarization for maintaining the inter-satellite link as the orbiting LEO satellite travels through the spot beam coverage area;
establish the inter-satellite link with the orbiting LEO satellite via a first spot beam of the sequence of the spot beams; and
transition the inter-satellite link from the first spot beam to subsequent spot beams in the sequence having the matching color re-use polarization as the LEO satellite travels through the spot beam coverage area.

20. The high throughput satellite of claim 19, wherein the digital processor is to digitally channelizing uplink data from the LEO satellite received over the inter-satellite link and route the digitally channelized uplink data to a different ground terminal specified by the LEO satellite.

21. The high throughput satellite of claim 20, wherein the routing is carried out in response to detection of a degraded feeder link to a target ground station.

* * * * *